United States Patent

Kearley

[15] 3,647,370
[45] Mar. 7, 1972

[54] SEPARATION OF POTASSIUM PHOSPHATE AND ALUMINA

[72] Inventor: Robert A. Kearley, Corpus Christi, Tex.
[73] Assignee: PPG Industries, Inc., Pittsburgh, Pa.
[22] Filed: Mar. 14, 1969
[21] Appl. No.: 807,438

[52] U.S. Cl. .................................................23/107, 23/143
[51] Int. Cl. ........................................C01b 25/30, C01f 7/34
[58] Field of Search ..................23/106, 107, 143; 71/34, 43

[56] References Cited

UNITED STATES PATENTS

| | | | |
|---|---|---|---|
| 1,873,490 | 8/1932 | Schulze | 23/107 |
| 2,871,095 | 1/1959 | Hervert et al. | 23/143 |

Primary Examiner—Oscar R. Vertz
Assistant Examiner—Gregory A. Heller
Attorney—Chisholm and Spencer

[57] ABSTRACT

Aqueous ammonia is employed to separate the phosphate content of a potassium aluminum phosphate as a solid phase. Typically, temperatures below 15° C. and ammonia concentration above 30 percent are relied upon.

10 Claims, No Drawings

3,647,370

SEPARATION OF POTASSIUM PHOSPHATE AND ALUMINA

BACKGROUND OF THE INVENTION

Aluminum phosphate ores are available from a plurality of geographic locations. If such ores are treated with potassium hydroxide, solutions may be obtained which contain phosphate, alumina and potassium values, i.e., potassium aluminum phosphates. This is an appealing source of potassium phosphate and alumina both of which have recognized uses.

It is important, however, that the phosphate and alumina be separated effectively from one another. For example, metallurgical grade alumina should be very low, preferably, substantially free of phosphate. So too, the presence of alumina in the potassium phosphate is undesirable.

U.S. Pat. No. 1,873,490 introduces ammonia gas at between 15° and 20° C. into the solution provided by heating an iron-alumina phosphate solution with dilute caustic potash at 60° C. for 5 hours. Formation of two liquid phases is reported, the denser of which is treated following water dilution with further ammonia to obtain a phosphate-rich layer. This procedure suffers from several deficiencies. It entails a plurality of ammoniations. Moreover, attempts to reproduce the procedure failed to provide the degree of separation and high recovery of alumina and phosphate values.

THE INVENTION

This invention concerns a method for resolving the phosphate and alumina contents of a potassium aluminum phosphate solution by precipitating phosphate values from solution as a solid phase. It has now been discovered that by establishing appropriate conditions, such as ammonia concentration and temperature, a solid phase rich in potassium phosphate may be precipitated from a potassium aluminum phosphate solution. Thus, by employing an ammonia concentration in the solution in excess of about 30 weight percent (basis the solution) it is possible to form a solid potassium phosphate precipitate lean in alumina.

To provide a solution which at atmospheric pressure will dissolve sufficient ammonia so as to effect this precipitation, according to one embodiment hereof, the solution temperature is below 15° C., typically in the practical range of 0° to 10° C. Cooler temperatures such as minus 10° C. or possibly lower but above that at which the solution freezes are however operable. Application of superatmospheric pressure to the solution, also is a means for increasing the capacity of the solution to absorb ammonia and attain a desirable ammonia concentration. Superatmospheric pressures up to 10 atmospheres gauge are those most apt to be relied upon; although higher pressures also may be employed they are likely to necessitate expenses (e.g., equipment costs) which outweigh any other advantages of their use.

Typical ammonia concentrations will range above 30 percent, more commonly between 35 and 60 weight percent, although higher concentrations will be at times attained especially when superatmospheric pressures prevail.

In the practice of a typical embodiment of this invention, an aqueous potassium aluminum phosphate solution of the type which is obtained by leaching an aluminum phosphate ore with potassium hydroxide is ammoniated to about ammonia saturation under ambient pressure (e.g., substantially atmospheric pressure) while the solution temperature is kept below 15° C., notably between 0° C. and 10° C. A solid precipitate forms under these conditions which is rich in phosphate, notably potassium phosphate. By recourse to optimum conditions, substantially quantitative precipitation of those phosphate values present in the solution is attainable. This precipitate is separated from the liquid by filtration or other mechanical expedient, leaving a mother liquor rich in alumina values and lean, often substantially free of phosphate.

The solid phase which is precipitated in performance of this invention is usually the heptahydrate of potassium phosphate, i.e., $K_3PO_4 \cdot 7H_2O$. However, the phosphate can be in the form of other potassium phosphates, e.g., $KPO_3$, $K_2HPO_4$, $KH_2PO_4$, $K_4P_2O_7 \cdot 3H_2O$. Often liquid is occluded or otherwise physically present with this precipitate, even after good filtration. Since this liquid will include alumina values preferred practices involve freeing the phosphate from it. Washing with anhydrous ammonia (or a concentrated aqueous solution of ammonia, e.g., one containing at least 60 percent $NH_3$) may be employed to remove the alumina from these solids. For this washing to be especially selective in removing the alumina values to the exclusion of phosphate values, it should be conducted at a temperature below 15° C., most conveniently at the temperature of the precipitation.

Substantially any aqueous potassium aluminum phosphate solution may be resolved into a phosphate rich-alumina lean portion and into an alumina rich-phosphate lean component. For the most part, the solutions treated in accordance with this invention are those which result from leaching the so-called aluminum phosphate ores with potassium hydroxide. These solutions as a rule will contain in the range of about 1 to 8 weight percent phosphorus on a $P_2O_5$ basis, 1 to 8 weight percent aluminum on an $Al_2O_3$ (alumina) basis and 3 to 15, even 20 weight percent potassium on a K (potassium) basis.

The following examples illustrate the manner in which this invention may be practiced.

EXAMPLE I

An aqueous solution prepared by dissolving $AlPO_4$ and $Al(OH)_3$ in hot aqueous potassium hydroxide (containing 35 weight percent KOH) was saturated with ammonia (by feeding gaseous ammonia thereto) and cooled to 9° C. at atmospheric pressure. As a result, a solid phase precipitated which was separated by vacuum filtration at 9° C. The phosphate, alumina and potassium content of the initial solution, precipitate and filtrate were determined analytically. Table 1 summarizes these data:

TABLE 1

Composition: Weight Percent

| | Initial Solution | Precipitate* | Filtrate | Precipitate | Liquid |
|---|---|---|---|---|---|
| | | | | Distribution** | |
| $Al_2O_3$ | 1.61 | 0.4 | 1.63 | 1.7 | 98.3 |
| $P_2O_5$ | 1.57 | 18.0 | 0.10 | 92.9 | 7.1 |
| K | 4.71 | 30.4 | 2.31 | 49.1 | 50.9 |
| $NH_3$ | — | 0.1 | 1.15 | 0.6 | 99.4 |

*This composition corresponds to that of moist $K_3PO_4 \cdot 7H_2O$ crystals.

**The solution upon treatment distributed into a precipitate comprising 6.8 weight percent and a filtrate constituting 93.2 weight percent of the material.

EXAMPLE II

A starting solution was prepared by the procedure of Example I analyzing by weight 1.6 percent $P_2O_5$, 1.6 percent $Al_2O_3$ and 4.7 percent potassium. Two hundred or 300 gram portions of this solution were measured into stainless steel containers exposed to the atmosphere. While chilling in an ice bath to a final temperature of 3° to 5° C. and while stirring gaseous ammonia was then fed under the liquid surface until ammonia bubbles freely escaped from the liquid. At this time, ammonia feed was discontinued, and the solution weighed to determine the amount of ammonia it had taken up. The crystals which precipitated were filtered in a chilled, sintered glass filter, using a gentle $NH_3$ or $N_2$ pressure. The respective weights and chemical compositions of the materials were determined. Table 2 summarizes the data from a plurality of such treatments:

TABLE 2

| Run | NH₃ solution concentration, weight percent | Composition of moist solids, weight percent | | | Portion of constituents present in moist precipitate, weight percent | | |
|---|---|---|---|---|---|---|---|
| | | P₂O₅ | Al₂O₃ | K | P₂O₅ | Al₂O₃ | K |
| 1 | 34.4 | 18.4 | 0.41 | 30.6 | 72.1 | 1.5 | 39.5 |
| 2 | 37.2 | 13.1 | 0.45 | 22.3 | 99.5 | 3.3 | 56.4 |
| 3 | 42.8 | 12.8 | 0.44 | 22.1 | >99.7 | 3.6 | 58.3 |
| 4 | 53.9 | 9.7 | 0.70 | 17.0 | >99.5 | 6.1 | 53.5 |
| 5* | | 13.1 | 0.27 | 22.0 | >99.6 | 1.9 | 55.1 |

*In this run, the ammonia take-up was not measured after filtration. The precipitate was washed with a chilled saturated ammonia solution.

These data demonstrate the precipitation of a solid phase rich in phosphate and lean in alumina by ammoniating a solution which is sufficiently cool to absorb a considerable amount of ammonia. If essentially complete recovery of the phosphate in the precipitate is desired, an ammonia concentration somewhat higher than the minimum concentration which results in a solid precipitate should be used at a temperature of about 3°–5° C. under ambient pressure.

EXAMPLE III

Duplicating the procedure described in Example II, potassium aluminate phosphate solutions having concentrations corresponding to those which would result from leaching ores with KOH solutions containing 10, 15, and 20 weight percent KOH (assuming the use of 20 percent excess KOH) were treated. Table 3 tabulates the results:

TABLE 3

| KOH concentration, weight percent | Leach solution composition, weight percent | | | Portion of constituents present in moist precipitate, weight percent | | |
|---|---|---|---|---|---|---|
| | P₂O₅ | Al₂O₃ | K | P₂O₅ | Al₂O₃ | K |
| 7* | 1.6 | 1.6 | 4.7 | >99.7 | 3.6 | 58.3 |
| 10 | 2.27 | | 6.8 | 99.8 | 8.9 | 57.3 |
| 15 | 3.27 | 3.23 | 9.6 | 99.7 | 6.3 | 56.6 |
| 20** | 4.14 | 4.17 | 12.4 | 99.8 | 35.7 | 68.0 |

*Run 3 from Table 2.
**The high Al₂O₃ content in the precipitate indicates less than optimum resolution.

EXAMPLE IV

Portions of a solution corresponding to that resulting from leaching ore with a KOH solution containing 20 weight percent KOH (analyzing by weight 4.1 to 4.7 percent P₂O₅, 4.1 to 4.6 percent Al₂O₃ and 12.0–13.7 percent potassium) were treated by the procedure described in Example II, except that the solution was cooled to 50° C., before commencing the addition of ammonia gas which was added at a rate such that the heat of solution did not cause the temperature to exceed 6° C.

After determining the NH₃ content of the solution, the precipitate was filtered in a chilled fritted glass filter funnel using a slight ammonia pressure which expedited filtration. In one instant, the precipitate was washed with a cold saturated solution of ammonia.

Table 4 summarizes the results:

TABLE 4

| NH₃ Concentration Weight Percent | Portion in Solid Phase | |
|---|---|---|
| | P₂O₅ | Al₂O₃ |
| 36 | 98.6 | 3.2 |
| 35 | 96.9 | 6.1 |
| Washed with NH₃ solution | 96.4 | 0.5 |
| 30 | 96.2 | 5.5 |
| | 95.9* | 0.1* |

*Corrected for mother liquor adhering to solids.

As these data demonstrate, a solid phosphate product may be precipitated which is lean in alumina and even virtually free of alumina from a solution which is relatively concentrated if the temperature is controlled with care. This is believed to avoid precipitation of an alumina product, e.g., KAlO₂·1.5 H₂O, or other solid phase alumina which might otherwise be encountered.

This method of resolving the phosphate and alumina values of a potassium aluminum phosphate solution integrates ideally with the winning of high grade alumina and agriculturally useful potassium phosphate from aluminum phosphate ores. The phosphate ore is initially digested with aqueous potassium hydroxide typically containing from 5 to 30 or even 50 weight percent KOH under mild temperatures, e.g., of 50° to 100° C. for 15 to 60 minutes; and the resulting water-soluble potassium aluminum phosphate (after being separated from insolubles) is ammoniated in the manner herein described. After being filtered, the moist potassium phosphate (notably K₃PO₄·7H₂O) is washed, dried and otherwise handled as necessary to its further use. Use of aqueous concentrated ammonia and cool temperatures is recommended for washing.

The filtrate which is primarily an aqueous ammoniated solution of potassium aluminate (KAlO₂) is stripped of ammonia, as by heating. This ammonia is recycled as the source of ammonia for the ammoniation step and ammonia wash water.

Once freed of ammonia, the remaining solution is hydrolyzed to aluminum hydroxide. This may be accomplished by heating the solution at 60° to 100° C. for an extended period, e.g., 10 to 100 hours. The solid hydrolysis product, Al(OH)₃, is filtered. A portion may be used to seed the hydrolysis step. Filtrate, in one efficient process, is returned to the ore leaching step to supply some of its KOH requirements as well as to reprocess some of the soluble alumina which remains unhydrolyzed.

Although the invention has been described by reference to specific details of certain embodiments, it is not intended the invention be construed as limited to such details except and to the extent these details appear in the claims.

I claim:

1. A method of separating phosphate values from an aqueous potassium aluminum phosphate solution which comprises establishing an ammonia concentration in the solution of at least 30 weight percent and precipitating a solid phosphate-rich phase.

2. The method of claim 1 wherein the ammonia concentration is between 35 and 60 weight percent.

3. The method of claim 1 wherein the ammoniated solution is below 15° C.

4. The method of claim 1 wherein the solid phase is separated from the liquid phase.

5. The method of separating the alumina and phosphate values of an aqueous potassium aluminum phosphate solution which comprises precipitating from the solution phosphate values therein as a solid phosphate-rich phase lean in alumina by substantially saturating with ammonia the solution at a temperature below 15° C.

6. The method of claim 5 wherein the ammoniated solution contains 35 to 60 weight percent ammonia.

7. The method of claim 5 wherein the solid precipitate is separated and washed with ammonia at a temperature below 15° C.

8. The method of claim 7 wherein the liquor remaining after separation of the solid phase is hydrolyzed to provide aluminum hydroxide.

9. The method of claim 5 wherein the ammoniated solution is at 0° to 10° C. and phosphate in the solid precipitate is present as potassium phosphate heptahydrate.

10. A method of obtaining phosphate and alumina values from aluminum phosphate ore which comprises digesting the ore in aqueous potassium hydroxide, separating a water soluble potassium aluminum phosphate solution which results from the digestion, ammoniating this solution to provide an ammonia concentration therein of at least 30 weight percent whereby to precipitate a solid phosphate-rich phase, separating the solid phase, stripping ammonia from the remaining liquid phase, recycling so stripped ammonia for the ammoniation of further potassium aluminum phosphate solution and hydrolyzing alumina in the liquid from which the ammonia has been stripped to form a separable solid aluminum hydroxide.

* * * * *